United States Patent [19]

Takashi et al.

[11] Patent Number: 5,148,904
[45] Date of Patent: Sep. 22, 1992

[54] CLUTCH COVER ASSEMBLY

[75] Inventors: Yukihisa Takashi, Toyoake; Nobuki Fukaya, Takahama, both of Japan

[73] Assignee: Aisin Seiki Kabushiki Kaisha, Kariya, Japan

[21] Appl. No.: 766,382

[22] Filed: Sep. 27, 1991

[30] Foreign Application Priority Data

Sep. 28, 1990 [JP] Japan .................................. 2-258908

[51] Int. Cl.⁵ ............................................. F16D 13/71
[52] U.S. Cl. ................................. 192/89 B; 192/70.27
[58] Field of Search ............... 192/70.27, 89 B, 109 A

[56] References Cited

U.S. PATENT DOCUMENTS

| | | | |
|---|---|---|---|
| 3,811,544 | 5/1974 | Maucher | 192/89 B |
| 4,602,708 | 7/1986 | Nagano | 192/70.27 |
| 4,641,736 | 2/1987 | Förster | 192/89 B |

FOREIGN PATENT DOCUMENTS

| | | | |
|---|---|---|---|
| 64-24732 | 1/1989 | Japan . | |
| 2-31025 | 2/1990 | Japan | 192/89 B |
| 2033499 | 5/1980 | United Kingdom | 192/89 B |
| WO89/01096 | 2/1989 | World Int. Prop. O. | 192/89 B |
| WO90/02887 | 3/1990 | World Int. Prop. O. | 192/89 B |

*Primary Examiner*—Richard Lorence
*Attorney, Agent, or Firm*—Burns, Doane, Swecker & Mathis

[57] ABSTRACT

A clutch cover assembly comprises an annular clutch cover, a pressure plate connected to the clutch cover, a diaphragm spring elastically disposed between the pressure plate and the clutch cover and supported circumferentially and radially to the clutch cover by a supporting member inserted into a hole formed therein and supported axially to the clutch cover through an annular member located between the inner wall of the clutch cover and the one end of the supporting member. The diaphragm spring is used for biasing the external portion of the pressure plate in the opposite direction to the clutch cover. A spring member includes an outer periphery which is located at an inward of the annular member and which is attached to the clutch cover and, an inner periphery which is located at a further inward of the outer periphery and which is attached to the diaphragm spring. The spring member is used for establishing a biasing force in the opposite direction to said clutch cover by an annular portion defined between the outer periphery and the inner periphery so as to prevent the load of the diaphragm spring from increasing as a facing of a clutch disk wears.

9 Claims, 7 Drawing Sheets

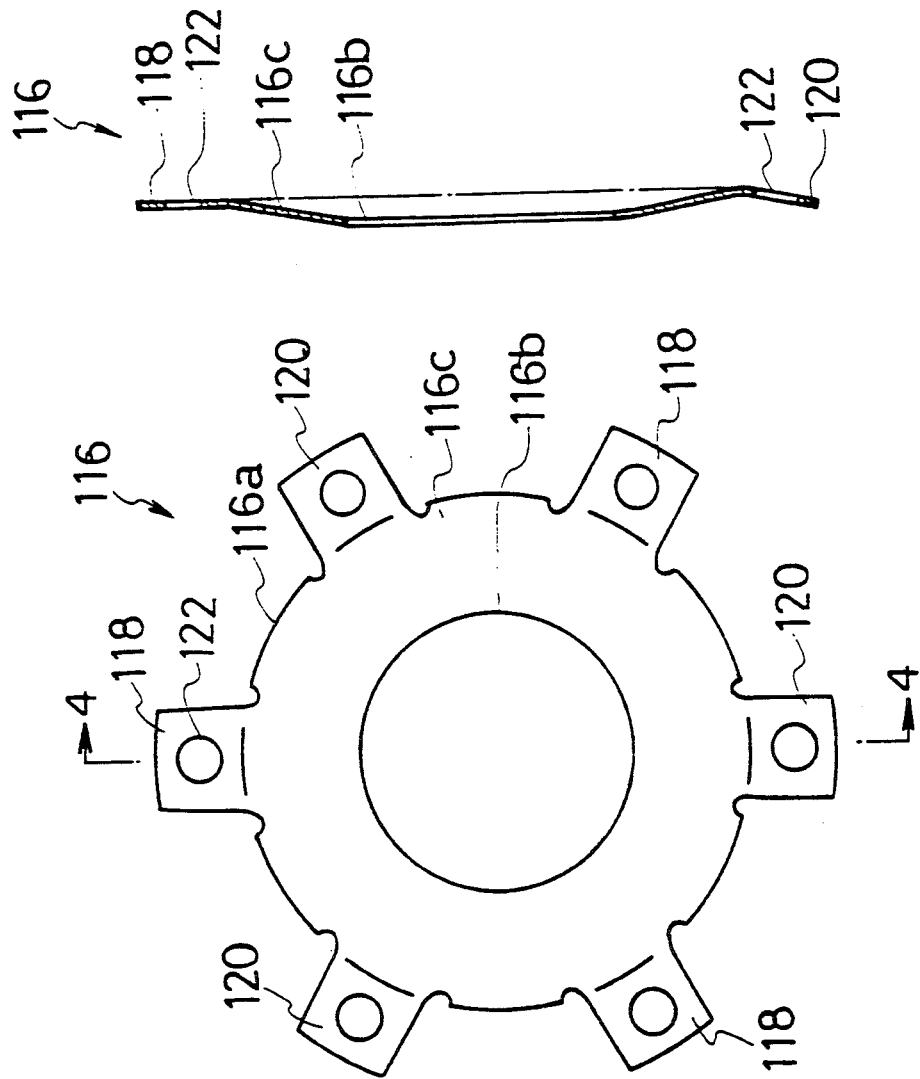

Pressure Plate Travel (mm)

CLUTCH COVER ASSEMBLY

BACKGROUND OF THE INVENTION

1. Field of the Invention

This invention relates to a clutch cover assembly used in an automotive vehicle or other vehicle, and more particularly, relates to a clutch cover assembly equipped with a diaphragm spring.

2. Description of the Prior Art

A conventional clutch cover assembly is shown in FIG. 9. The clutch cover assembly is disclosed in Japanese Utility Model Laid-Open Print No. 64-24732/1989. FIG. 9 is a sectional view of an upper half portion of the clutch cover assembly.

The clutch cover assembly 10 includes a clutch cover 12. The clutch cover 12 is rotatably connected to a flywheel 14 of an engine side at an external portion 12a of plurality the clutch cover 12 through a plurality of equally pitched pins (not shown). A diaphragm spring 16 is disposed in the clutch cover 12 and is supported by a plurality of equally pitched rivets 18 and a plurality of pivot rings 20. Each rivet 18 is fixedly connected to an internal portion 12b of the clutch cover 12 and is inserted into a cutting portion 16a of the diaphragm spring 16. Therefore, the diaphragm spring 16 is prevented from moving with respect to the clutch cover 12 in the circumferential direction and in the vertical direction. The diaphragm spring 16 is held by three pivot rings 20 which are located between an inner wall 12c of the clutch cover 12 and a flange 18a of the rivet 18 so as to be prevented from moving with respect to the clutch cover 12 in the axial direction. The external portion 16b of the diaphragm spring 16 is elastically attached to a pressure plate 22 connected to the clutch cover 12 through a strap (not shown) as an elastic member. As a result, the pressure plate 22 is biased toward the flywheel 14. Therefore, a facing 24 is held by the flywheel 14 and the pressure plate 22 and comes into frictional engagement therewith. The facing 24 is connected to a well-known clutch disk 26 connected to an output shaft of a transmission side. Consequently, a driving force produced by the engine is transmitted from the flywheel 14 to the output shaft. A release bearing 28 is provided at the internal portion 16c of the diaphragm spring 16 and biases the diaphragm spring 16 in a direction of the flywheel 14 when a clutch pedal (not shown) is depressed by the vehicle operator. As a result, the external portion 16b of the diaphragm spring 16 is moved toward the clutch cover 12, because a contacting point between the diaphragm spring 16 and the pivot rings 20 works as a fulcrum point. Thus, the biasing force of the diaphragm spring 16 acting to the pressure plate 22 is decreased according to the movement of the external portion 16b relative to the clutch cover 12. The pressure plate 22 is biased by the strap and is travelled in a direction of the clutch cover 12. Thereby, the engagement of the facing 24 is released. The transmission of the driving force between the flywheel 14 and the output shaft is interrupted.

FIG. 10 is a graph showing the load characteristic of the diaphragm spring 16 and a return spring 30 as described later. The diaphragm spring 16 has the load characteristic curve A and is set at a position or a deflection P in the assembling of the clutch cover assembly. M indicates a set load in accordance with the position P. The right side of the position P indicates a travel of the pressure plate 22 relative to the clutch cover 12. Consequently, when the release bearing 28 biases the diaphragm spring 16 toward the flywheel 14, the external portion 16b of the diaphragm spring 16 is moved toward the clutch cover 12. Therefore, the pressure plate 22 is movable in the range of the right side of the position P. As a result, the load of the diaphragm spring 16 is changeable in response to the travel of the pressure plate 22 in the range of the right side of the position P. The left side of the position P indicates a travel of the pressure plate 22 relative to the flywheel 14. Under the normal condition of the clutch cover assembly 10, the pressure plate 22 fails to move toward the flywheel 14, because the pressure plate 22 is in engagement with the facing 24 as shown in FIG. 9, whereas, as the facing 24 wears by using the clutch cover assembly 10 for a long time period, the pressure plate 22 is moved toward the flywheel 14 by the biasing force of the diaphragm spring 16. The external portion 16b of the diaphragm spring 16 is therefore moved toward the flywheel 14. Thereby, the load of the diaphragm spring 16 is changeable in response to the travel of the pressure plate 22 in the range of the right side of the position P. As a result, when the facings 24 wear, the load of the diaphragm spring 16 becomes greater than the set load M. This causes an increase in the biasing force of the release bearing 28, because when the external portion 16b of the diaphragm spring 16 biases the pressure plate 22 toward the flywheel 14, the internal portion 16c of the diaphragm spring 16 biases the release bearing 28 during the engagement of the facing 24. Consequently, the depression of the clutch pedal is increased in comparison to the normal condition of the clutch cover assembly 10.

In the light of the above-mentioned drawback, the foregoing clutch cover assembly 10 is provided with a return spring 30 which is arranged between the diaphragm spring 16 and the pressure plate 22 as illustrated in FIG. 9. The return spring 30 is supported by the rivets 18 inserted into a hole 30a so as to be prevented from moving with respect to the clutch cover 12 in the circumferential and in the vertical direction. The return spring 30 is held by the pivot rings 20 which are located at both sides thereof so as not to be movable in the axial direction. The external portion 30b of the return spring 30 is bent toward the diaphragm spring 16 and is attached to the surface of the diaphragm spring 16. The return spring 30 also has a load characteristic curve B as shown in FIG. 10. Namely, when the external portion 16b of the diaphragm spring 16 moves toward the flywheel 14 as the facings 24 wear, the return spring 30 biases the diaphragm spring 16 in a direction of the clutch cover 12 so as to cancel the biasing force of the diaphragm spring 16 to the flywheel 14. Accordingly, the load characteristic of the diaphragm spring 16 can be controlled according to the dotted line C. Therefore, the load of the diaphragm spring 16 is less than the set load M even though the facing 24 wears. Thus, the increasing of the depression of the clutch pedal can be prevented.

However, the foregoing clutch cover assembly has the following three problems (a), (b) and (c).

(a) Three pivot rings 20 are required to be held between the diaphragm spring 16 and the return spring 30. As a result, the clutch cover assembly 10 becomes large in the axial direction.

(b) The return spring 30 is firmly held at a location near the hole 30a by the pivot rings 20. Therefore, the stress is centered at the periphery of the hole 30a with the result that the return spring 30 cracks start therefrom.

(c) The return spring is attached to the diaphragm spring 16 at the external portion 16b thereof. Therefore, a span of the return spring 30 which is defined by a distance between the diaphragm spring 16 and the pivot rings 20 is small, because there is small space defined between the pivot rings 20 and the clutch cover 12 in the upward direction. Thereby, the load characteristic of the return spring 30 becomes a sharp curve and a narrow range. Thus, it is difficult to set the position P. Moreover, since the external portion 30b is bent toward the clutch cover 12 in order to have a large span, it brings the complex design of the return spring 30.

SUMMARY OF THE PRESENT INVENTION

It is a primary object of the invention to provide an improved clutch cover assembly which obviates the above-described drawbacks.

In order to attain the above-mentioned objective, a clutch cover assembly is comprised of a pressure plate connected to the clutch cover, a diaphragm spring elastically disposed between the pressure plate and the clutch cover and supported circumferentially and radially to the clutch cover by a supporting member inserted into a hole formed therein and supported axially to the clutch cover through an annular member located between the inner wall of the clutch cover and the one end of the supporting member, the diaphragm spring being used for biasing the external portion of the pressure plate in the opposite direction to the clutch cover and, spring member including an outer periphery which is located at an inward of the annular member and which is attached to the clutch cover and, an inner periphery which is located at a further inward of the outer periphery and which is attached to the diaphragm spring, the spring member being used for establishing a biasing force in the opposite direction to said clutch cover by an annular portion defined between the outer periphery and the inner periphery.

BRIEF DESCRIPTION OF THE DRAWINGS

FIG. 3 is an enlarged front view of a return spring of the present invention.

FIG. 4 is a cross sectional view of a return spring taken along line B—B in FIG. 3.

DETAILED DESCRIPTION OF PREFERRED EMBODIMENTS OF THE INVENTION

Figure 1:
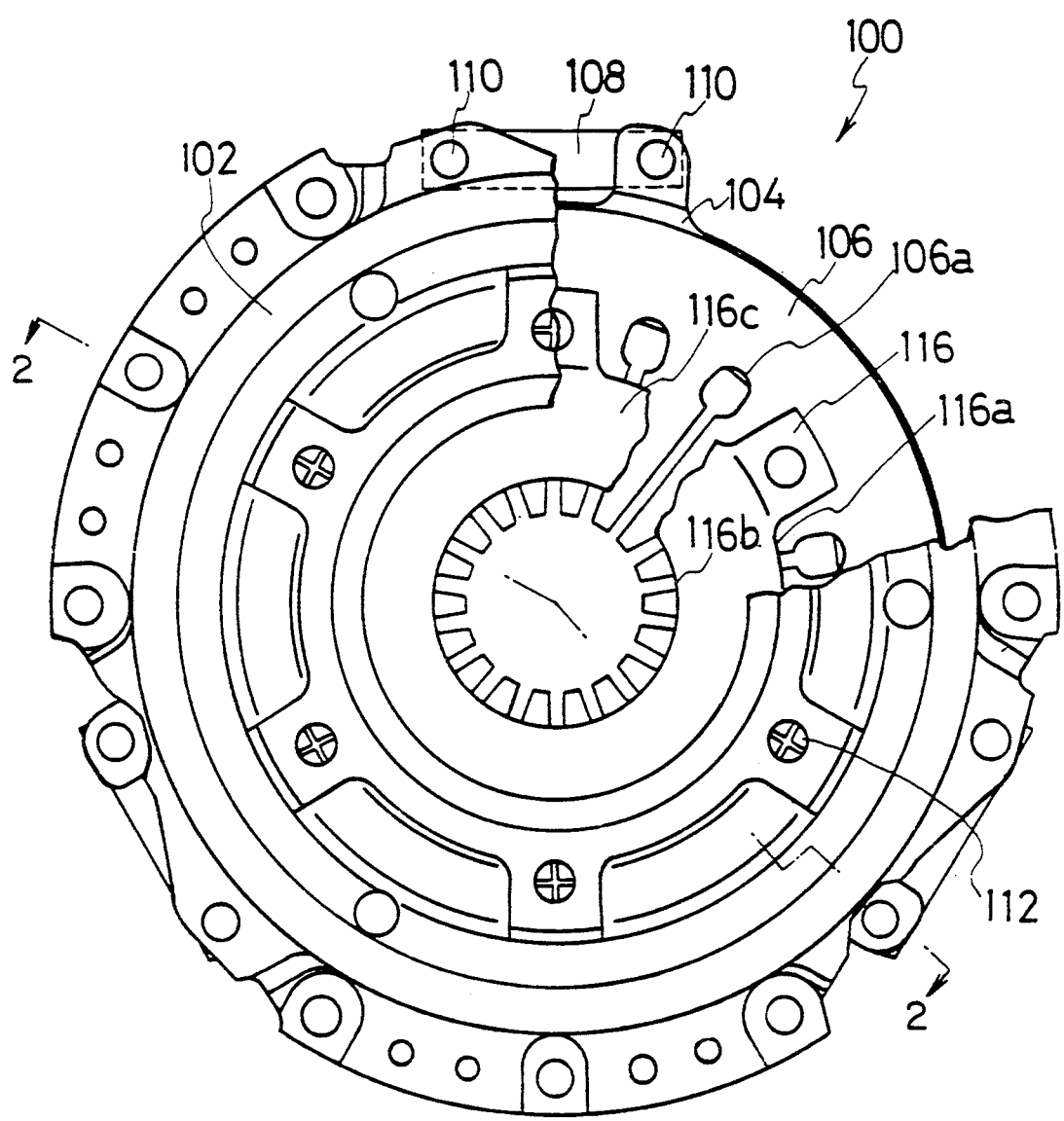
FIG. 1 is a front view of a clutch cover assembly according to an embodiment of the present invention.
Figure 2:
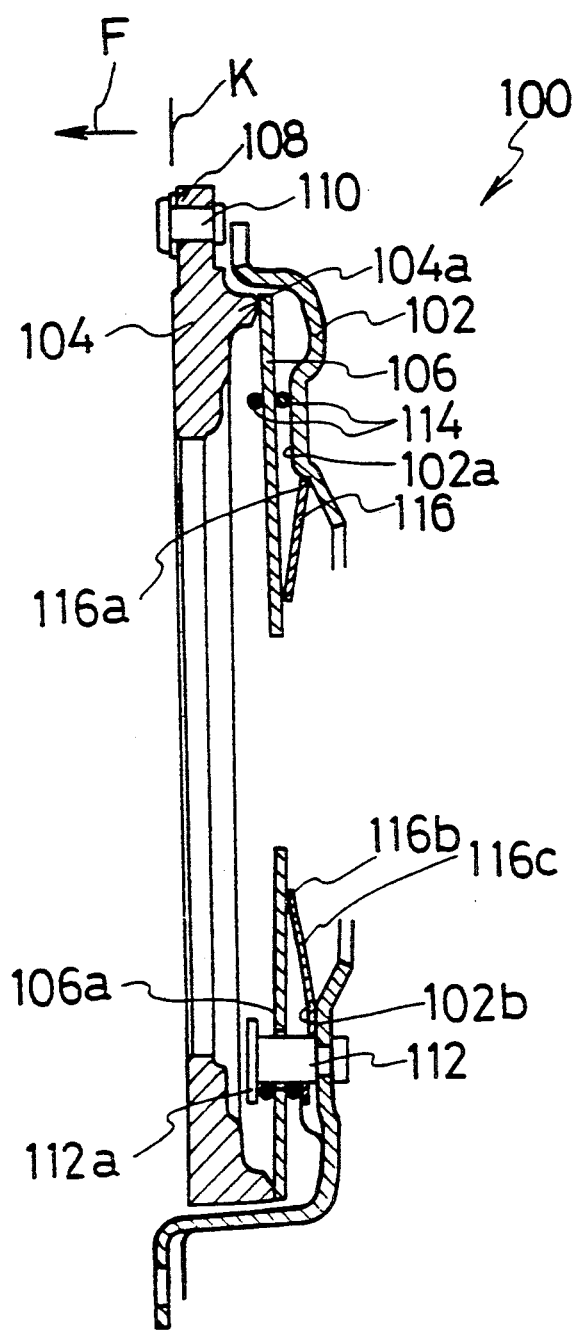
FIG. 2 is a cross sectional view of a clutch cover assembly taken along line A—A in FIG. 1.

A clutch cover assembly according to an embodiment of the invention will be described in detail hereinafter. FIG. 1 is a front view of the clutch cover assembly. FIG. 2 is a cross sectional view of the clutch cover assembly taken along line A—A in FIG. 1.

Referring to FIG. 1 and FIG. 2, numeral 102 indicates a clutch cover, numeral 104 indicates a pressure plate, and numeral 106 indicates a diaphragm spring. The pressure plate 104 is connected to the clutch cover 102 by a plurality of equally pitched straps 108 and a plurality of equally pitched rivets 110. Therefore, the pressure plate 104 is rotated together with the clutch cover 102 and is movable with respect to the clutch cover 102 in the axial direction by the plurality of straps 108.

The diaphragm spring 106 is elastically disposed between the pressure plate 104 and the clutch cover 102 and is supported circumferentially and radially to the clutch cover 102 by a plurality of equally pitched set-rivets 112 which are inserted into a plurality of cut-away portions 106a formed on the diaphragm spring 106. The diaphragm spring 106 is also supported axially to the clutch cover 102 by two annular rings 114 which are located between the inner wall 102a of the clutch cover 102 and the flange portion 112a of each set-rivet 112. The diaphragm spring 106 biases the external portion 104a of the pressure plate 104 in the opposite direction of the clutch cover 102 or a flywheel (not shown).

A return spring 116 is disposed between the clutch cover 102 and the diaphragm spring 106 and, comprises an outer periphery 116a which is located radially inwardly of the annular rings 114 and which contacts an annular point 102b of the inner wall 102a of the clutch cover 102 and, an inner periphery 116b which is located further radially inwardly of the outer periphery 116a and which contacts the diaphragm spring 106.

FIG. 3 is an enlarged front view of a return spring 116. FIG. 4 is a cross sectional view of a return spring taken along line B—B in FIG. 3. The return spring 116 includes an annular portion 116c defined between the outer periphery 116a and the inner periphery 116b. The annular portion 116c is cone-shaped in section and establishes a biasing force in the opposite direction of the clutch cover 102.

Figure 5:
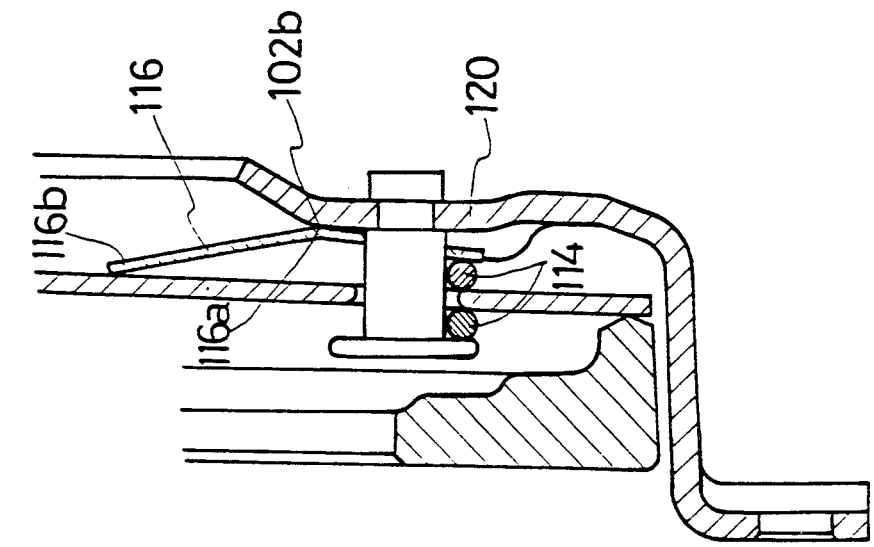
FIG. 5 and FIG. 6 each of which is partially enlarged sectional view of the clutch cover assembly of the present invention.
Figure 6:
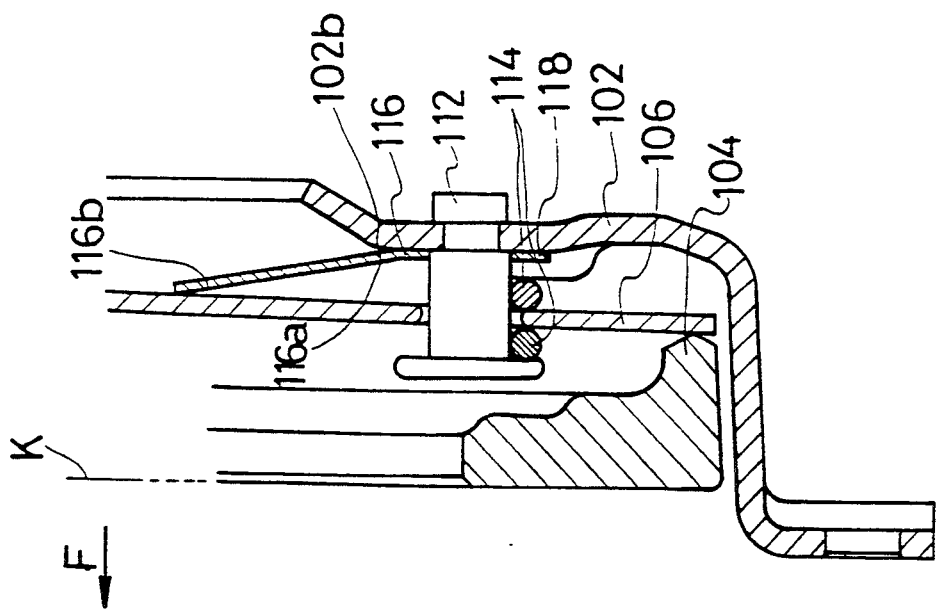

The return spring 116 includes a plurality of equally pitched projections 118 and 120 which project out of the outer periphery 116a radially outwardly and which are integrally formed with the annular portion 116c. As illustrated in FIG. 4, the projections 118 and 120 have different angles with respect to the annular portion 116c each other and are disposed alternately in the circumferential direction. Each of the projections 118 extends parallel to the radius of the clutch cover 102 and, each of the other projections 120 extends so as to make an angle with respect to the radius of the clutch cover 102. A plurality of holes 122 are formed at the projections 118 and 120. As seen in FIG. 5 and FIG. 6 each of which is a partially enlarged sectional view of the clutch cover assembly, the return spring 116 is loosely fitted in the set-rivets 112 through the holes 122. Therefore, the return spring 116 is loosely supported to the clutch cover 102 through the set-rivets 112 in the axial direction. As shown in FIG. 5, the projections 118 contact the inner wall 102a of the clutch cover 102 and, the other projections 120 contact one of the annular rings 114.

The operation of the above-mentioned clutch cover assembly 100 will be described below.

The biasing force of the return spring 116 is zero under the condition as illustrated in FIG. 2. In the case where a frictional facing (not shown) of a well-known clutch disk (not shown) wears, the pressure plate 104 is biased by the diaphragm spring 106. Therefore, the pressure plate 104 is moved from a predetermined engaging position K into a direction illustrated by an arrow F. Thereby, the internal portion of the diaphragm spring 106 moves toward the clutch cover 102. The return spring 116 biases the internal portion of the diaphragm spring 106 toward the arrow F so as to decrease a biasing force of the diaphragm spring 106.

On the contrary, when a clutch pedal (not shown) is depressed by an operator (not shown), the internal portion of the diaphragm spring 106 is biased in the direction indicated by the arrow F by a release bearing (not shown). Therefore, the external portion of the diaphragm spring is positioned away from the pressure plate 104. As a result, the return spring 116 is positioned away from the diaphragm spring 106.

Figure 8:
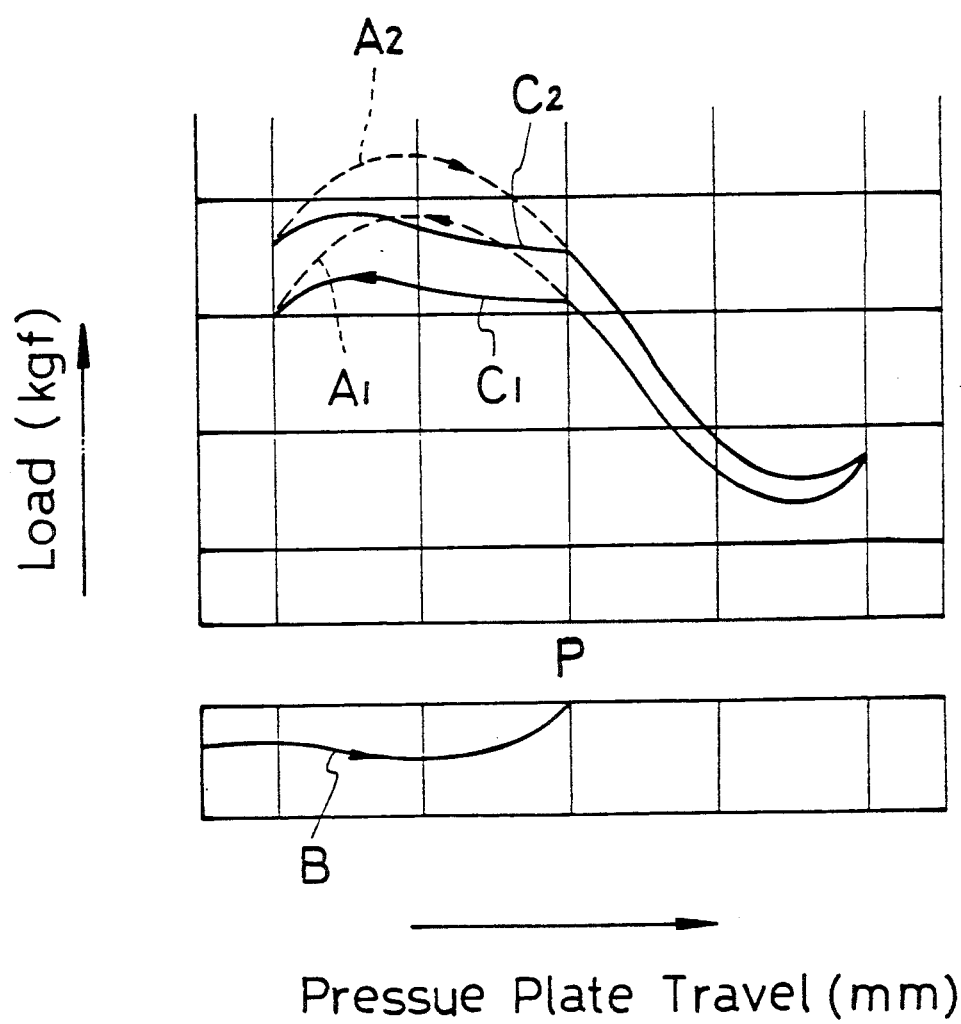
FIG. 8 is a graph showing the load characteristic of a diaphragm spring and the return spring of the invention.
Figure 10:
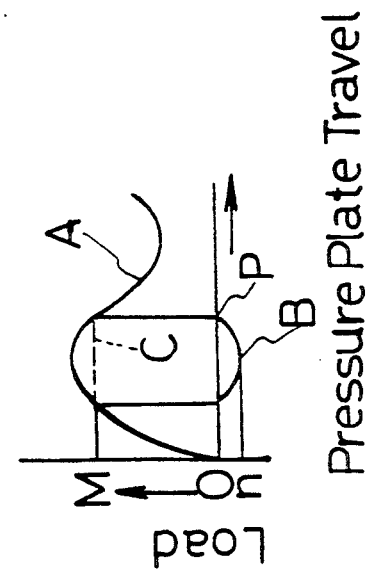
FIG. 10 is a graph showing the load characteristic of each of a diaphragm spring and a return spring of FIG. 9.

FIG. 8 is a graph showing the load characteristic of the diaphragm spring 106 and the return spring 116. The diaphragm spring 106 has the load characteristic curves A1 and A2 due to the hysterisis thereof. A1 is the load characteristic curve when the diaphragm spring 106 is biased in the direction of the arrow F by the release bearing. A2 is the load characteristic curve when the diaphragm spring 106 is returned toward the clutch cover 102. The return spring 116 has the load characteristic curve B. The load of the return spring 116 is zero at a position P which illustrates the predetermined engaging position K of the pressure plate 104. The pressure plate 104 is moved from the position P into the leftward direction as the frictional facing wears. Therefore, the return spring 116 establishes the biasing force in the opposite direction to that of the diaphragm spring 106. Thus, the real load characteristic curves of the diaphragm spring 106 become nearly plain or smooth curves C1 and C2 respectively. Consequently, even if the frictional facing wears, the load of the diaphragm spring 106 can be prevented from being increased.

Figure 9:
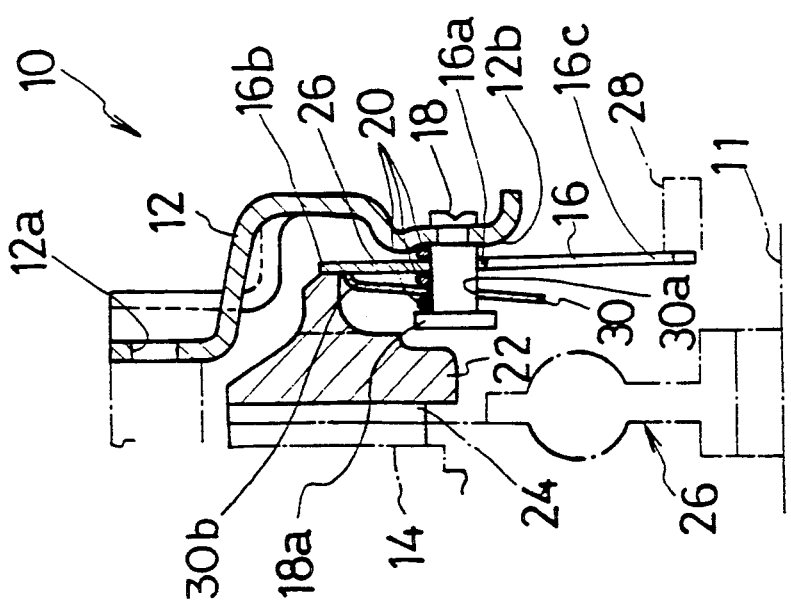
FIG. 9 is a partially enlarged sectional view of the conventional clutch cover assembly.

The return spring 116 establishes the biasing force in the opposite direction to the clutch cover 102 by the annular portion 116c defined between the outer periphery 116a and the inner periphery 116b. Therefore, the number of the annular rings 114 can be decreased as compared to the foregoing conventional clutch cover assembly as shown in FIG. 9. Thus, in the present invention, the clutch cover assembly 100 becomes small in the axial direction resulting in a compact engine of the vehicle.

Moreover, the outer periphery 116a of the return spring 116 is located at an inward of the annular rings 114 and is attached to an annular point 102b of the inner wall 102a of the clutch cover 102. On the other hand, the inner periphery 116b of the return spring 116 is located further inwardly of the outer periphery 116a and is attached to the diaphragm spring 106. As a result, the return spring 116 has large span which is defined by a distance between the outer periphery 116a and the inner periphery 116b in comparison with the foregoing conventional clutch cover assembly as shown in FIG. 9. Accordingly, the load characteristic of the return spring 116 becomes a smooth curve B. The load of the diaphragm spring 106 can be reduced in the wide range of the load characteristic thereof. Further, it is easy to set for the position P. The inner periphery 116a is also not required to bend as in the conventional type. Thus, it is possible to obtain an easy design of the return spring 116.

The return spring 116 is loosely supported to the clutch cover 102 in the axial direction thereof through the set-rivets 112. The projection 118 is attached to the inner wall 102a of the clutch cover 102 and, the other projection 120 is attached to one of the annular rings 114. Therefore, when the internal portion of the diaphragm spring 106 moves toward the clutch cover 102, as shown in FIG. 5, the end of the projection 118 is positioned away from the inner wall 102a of the distal clutch cover 102 in the axial direction. Therefore, the stress is prevented from centering at the outer periphery 116a and the holes 122. Also, the other projection 120 prevents the return spring 116 from rattling in the axial direction.

Figure 7:
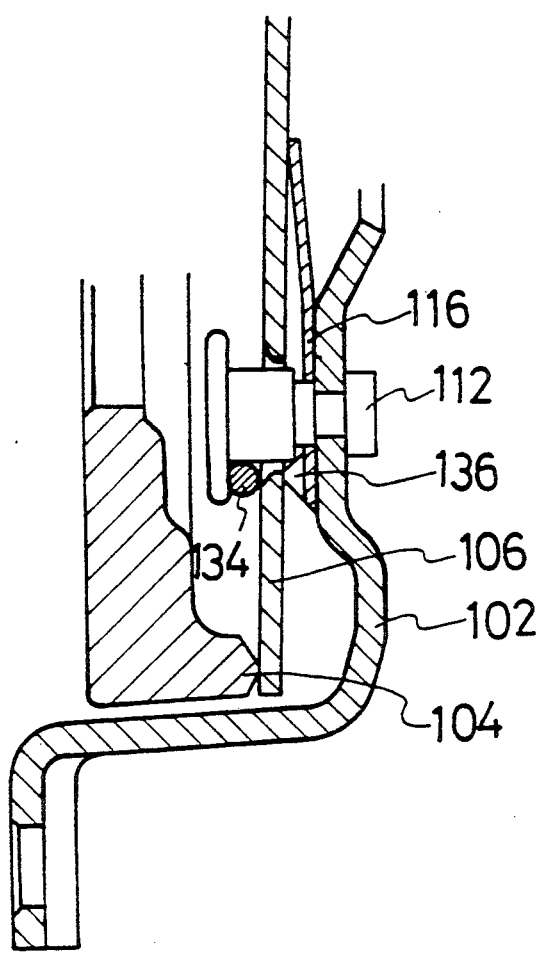
FIG. 7 is a sectional view of a clutch cover assembly according to another embodiment of the present invention.

FIG. 7 is a sectional view of a clutch cover assembly according to another embodiment of the present invention.

In this embodiment, the diaphragm spring 106 is supported by single annular ring 134 and an annular convex portion 136 formed on the inner wall 102a of the clutch cover 102. Accordingly, the number of annular rings 134 can be further decreased as compared to the above-mentioned embodiment. Thereby, the clutch cover assembly 100 becomes further small in the axial direction.

It should be understood that, although the preferred embodiments of the present invention have been described herein in considerable detail, certain modifications, changes, and adaptations may be made by those skilled in the art and that it is hereby intended to cover all modifications, changes and adaptations thereof falling within the scope of the appended claims.

What is claimed is:

1. A clutch cover assembly comprising:
   an annular clutch cover;
   a pressure plate connected to said clutch cover;
   a diaphragm spring elastically disposed between said pressure plate and said clutch cover, said diaphragm spring being supported circumferentially and radially on said clutch cover by a supporting member inserted into a hole formed in said clutch cover, said diaphragm spring being supported axially on said clutch cover through an annular member located intermediate an inner wall of said clutch cover and one end of said supporting member, said diaphragm spring biasing an external portion of said pressure plate in the opposite direction of said clutch cover; and
   spring means for establishing a biasing force in a direction opposite to said clutch cover, said spring means including an outer periphery which is located radially inwardly of said annular member and which contacts said clutch cover, and an inner periphery which is located radially inwardly of the outer periphery of the spring means and which contacts said diaphragm spring, said spring means including an annular portion defined between said outer periphery and said inner periphery, said spring means having a plurality of projections that extend outwardly from the outer periphery of the spring means, one of the projections extending from the outer periphery of the spring means forming an angle with respect to the annular portion that is different than the angle that another of said projections extending from the outer periphery of the spring means forms with said annular portion.

2. A clutch cover assembly according to claim 1, wherein
said plurality of projections includes a plurality of first projections and a plurality of second projections, said first and second projections being spaced apart from one another and alternating with one another, each of said first projections forming a different angle with respect to said annular portion than said second projections, said one projection being a first projection and said another projection being a second projection.

3. A clutch cover assembly according to claim 2, wherein
said plurality of first projections extend parallel to a portion of said clutch cover and the plurality of second projections form an angle with respect to said portion of said clutch cover.

4. A clutch cover assembly according to claim 1, wherein
said spring means is supported on said clutch cover through said supporting member so as to be movable in the axial direction.

5. A clutch cover assembly according to claim 4, wherein
each of said plurality of projections has a hole into which said supporting member is loosely fitted.

6. A clutch cover assembly according to claim 5, wherein
said plurality of projections include a first set of projections that contact an inner wall of said clutch cover and a second set of projections that contact said annular member, said one projection being in said first set and said another projection being in said second set.

7. A clutch cover assembly according to claim 1, wherein
said spring means applies the biasing force to said diaphragm spring so as to decrease a biasing force of said diaphragm spring as said pressure plate is moved in the opposite direction to said clutch cover.

8. A clutch cover assembly according to claim 1, wherein
said spring means is positioned away from said diaphragm spring when an external portion of said diaphragm spring is positioned away from said pressure plate.

9. A clutch cover assembly according to claim 1, wherein
said annular member includes at least one ring member and an annular convex portion formed on the inner wall of said clutch cover.

* * * * *